US008639684B2

(12) United States Patent  
Djabarov

(10) Patent No.: US 8,639,684 B2
(45) Date of Patent: *Jan. 28, 2014

(54) DYNAMIC SEARCH BOX FOR WEB BROWSER

(75) Inventor: George Djabarov, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 14 days.

This patent is subject to a terminal disclaimer.

(21) Appl. No.: 13/209,598

(22) Filed: Aug. 15, 2011

(65) Prior Publication Data

US 2011/0302188 A1 Dec. 8, 2011

Related U.S. Application Data

(63) Continuation of application No. 11/321,075, filed on Dec. 30, 2005, now Pat. No. 8,010,523.

(51) Int. Cl.
*G06F 7/00* (2006.01)
*G06F 17/30* (2006.01)

(52) U.S. Cl.
USPC ........... 707/721; 707/706; 707/767; 715/815; 715/816

(58) Field of Classification Search
USPC ................................................. 715/700–866
See application file for complete search history.

(56) References Cited

U.S. PATENT DOCUMENTS

| 5,649,222 A | 7/1997 | Mogilevsky |
| 5,687,364 A | 11/1997 | Saund et al. |
| 5,845,300 A | 12/1998 | Comer et al. |
| 5,892,919 A | 4/1999 | Nielsen |
| 5,907,680 A | 5/1999 | Nielsen |
| 5,920,854 A | 7/1999 | Kirsch et al. |
| 5,954,798 A | 9/1999 | Shelton et al. |
| 5,995,928 A | 11/1999 | Nguyen et al. |
| 6,006,225 A | 12/1999 | Bowman et al. |
| 6,032,162 A | 2/2000 | Burke |
| 6,037,934 A | 3/2000 | Himmel et al. |

(Continued)

FOREIGN PATENT DOCUMENTS

| CN | 1670723 A | 9/2005 |
| EP | 1 359 516 | 5/2003 |
| WO | WO 2005/033967 | 4/2005 |

OTHER PUBLICATIONS

No author, Partial and Full URL's http://amdar.noaa.gov/~moninger/web101/1-lecture/partial.html, 1996, p. 1.

(Continued)

*Primary Examiner* — Fred I Ehichioya
*Assistant Examiner* — Michelle N. Owyang
(74) *Attorney, Agent, or Firm* — Harrity & Harrity, LLP

(57) ABSTRACT

A system may receive one or more terms of a search query. The system may automatically identify prior search queries that include the one or more terms of the search query from a history of prior search queries. The system may automatically identify possible spelling corrected search queries based on the one or more terms of the search queries. The system may automatically receive remote server-based query completion suggestions including the one or more terms of the search query. The system may present query refinement options, the query refinement box being populated with the prior search queries as suggested queries for possible selection by a user, the identified possible spelling corrected search queries, and the received query completion suggestions.

19 Claims, 8 Drawing Sheets

(56) References Cited

U.S. PATENT DOCUMENTS

| | | | |
|---|---|---|---|
| 6,041,360 | A | 3/2000 | Himmel et al. |
| 6,067,565 | A | 5/2000 | Horvitz |
| 6,096,096 | A | 8/2000 | Murphy et al. |
| 6,125,361 | A | 9/2000 | Chakrabarti et al. |
| 6,144,958 | A | 11/2000 | Ortega et al. |
| 6,199,986 | B1 | 3/2001 | Williams et al. |
| 6,243,071 | B1 | 6/2001 | Shwarts et al. |
| 6,278,449 | B1 | 8/2001 | Sugiarto et al. |
| 6,281,886 | B1 | 8/2001 | Ranieri |
| 6,321,228 | B1 | 11/2001 | Crandall et al. |
| 6,324,566 | B1 | 11/2001 | Himmel et al. |
| 6,377,965 | B1 | 4/2002 | Hachamovitch et al. |
| 6,393,389 | B1 | 5/2002 | Chanod et al. |
| 6,493,702 | B1 | 12/2002 | Adar et al. |
| 6,546,388 | B1 | 4/2003 | Edlund et al. |
| 6,546,393 | B1 | 4/2003 | Khan |
| 6,564,213 | B1 * | 5/2003 | Ortega et al. ............ 1/1 |
| 6,598,051 | B1 | 7/2003 | Wiener et al. |
| 6,631,496 | B1 | 10/2003 | Li et al. |
| 6,647,383 | B1 | 11/2003 | August et al. |
| 6,687,689 | B1 | 2/2004 | Fung et al. |
| 6,704,727 | B1 | 3/2004 | Kravets |
| 6,708,250 | B2 | 3/2004 | Gillingham |
| 6,751,606 | B1 | 6/2004 | Fries et al. |
| 6,819,336 | B1 | 11/2004 | Nielsen |
| 7,111,000 | B2 | 9/2006 | Wen et al. |
| 7,149,970 | B1 | 12/2006 | Pratley et al. |
| 7,152,064 | B2 | 12/2006 | Bourdoncle et al. |
| 7,216,290 | B2 | 5/2007 | Goldstein et al. |
| 7,254,774 | B2 * | 8/2007 | Cucerzan et al. ......... 715/257 |
| 7,428,529 | B2 * | 9/2008 | Zeng et al. ............ 1/1 |
| 7,587,385 | B2 * | 9/2009 | Vayssiere ............ 1/1 |
| 7,676,517 | B2 * | 3/2010 | Hurst-Hiller et al. ....... 707/713 |
| 7,779,015 | B2 * | 8/2010 | Abbott et al. ............ 707/754 |
| 2001/0047355 | A1 | 11/2001 | Anwar |
| 2002/0023145 | A1 | 2/2002 | Orr et al. |
| 2002/0078045 | A1 | 6/2002 | Dutta |
| 2002/0174145 | A1 | 11/2002 | Duga et al. |
| 2002/0187815 | A1 | 12/2002 | Deeds et al. |
| 2003/0023582 | A1 | 1/2003 | Bates et al. |
| 2003/0135725 | A1 | 7/2003 | Schirmer et al. |
| 2003/0143979 | A1 | 7/2003 | Suzuki et al. |
| 2003/0145087 | A1 | 7/2003 | Keller et al. |
| 2003/0212563 | A1 | 11/2003 | Ju et al. |
| 2003/0220913 | A1 | 11/2003 | Doganata et al. |
| 2004/0010520 | A1 | 1/2004 | Tsnag et al. |
| 2004/0064577 | A1 | 4/2004 | Dahlin et al. |
| 2004/0254928 | A1 | 12/2004 | Vronay et al. |
| 2004/0267600 | A1 * | 12/2004 | Horvitz ............ 705/10 |
| 2005/0080771 | A1 | 4/2005 | Fish |
| 2005/0203878 | A1 | 9/2005 | Brill et al. |
| 2005/0210383 | A1 | 9/2005 | Cucerzan et al. |
| 2005/0246211 | A1 | 11/2005 | Kaiser |
| 2005/0283468 | A1 | 12/2005 | Kamvar et al. |
| 2006/0106769 | A1 * | 5/2006 | Gibbs ............ 707/3 |
| 2006/0259861 | A1 * | 11/2006 | Watson ............ 715/705 |
| 2007/0162422 | A1 | 7/2007 | Djabarov |

OTHER PUBLICATIONS

Anselmo Penas et al., Browsing by phrases: terminological information in interactive multilingual text retrival, Proceedings of the 1$^{st}$ ACM/IEEE-CS joint conference on digital libraries, pp. 253-254, Jan. 2001, Roanoke, Virginia, United States.

International Search Report and Written Opinion dated Mar. 21, 2007, issued in corresponding PCT Application No. PCT/US2006/062651.

S. Kolvenbach et al., "A Toolbar for Efficient Interaction in Online Communities", Fraunhofer-Institute for Applied Information Technology FIT, XP-002420571, Aug. 30, 2005-Sep. 3, 2005, 8 pages.

I. Cruz, "A User Interface for Distributed Multimedia Database Querying with Mediator Supported Refinement", Department of Computer Science—ADVIS Research Group, XP-10348677, Aug. 2, 1999, pp. 433-441.

D. Hoong et al., "Guided Google: A Meta Search Engine and its Implementation using the Google Distributed Web Services", Grid Computing and Distributed Systems (GRIDS) Laboratory, XP-002420583, Feb. 13, 2003, 8 pages.

P. Anick et al., "The Paraphrase Search Assistant: Terminological Feedback for Iterative Information Seeking", Compaq Computer Corporation, XP-000970713, Aug. 1999, pp. 153-159.

B. Koester, "Conceptual Knowledge Processing with Google", Webstrategy GmbH, XP-002420550, Oct. 2005, pp. 178-183.

W. Lam et al., "Automatic Text Categorization and Its Application to Text Retrieval", XP-002420552, 1999, pp. 865-879.

International Preliminary Report on Patentability dated Jul. 10, 2008 issued in corresponding international application No. PCT/US2006/062651, 8 pages.

Varghese, Sam "Google Suggest Comes Online"; The Sydney Morning Herald, Dec. 15, 2004.

Google Web Help—Google Suggest, 2010.

Chris Richardson, "Mac User Makes Auto Complete Search Function for Safari", WebProNews, Jul. 19, 2005, 2 pages.

David Watanabe, "DWBlog—Inquisitor 1.0", http://www.newsfirex.com/blog/?p=47, Jul. 18, 2005, 4 pages.

European Search Report corresponding to EP 12 17 8506 mailed Dec. 14, 2012, 8 pages.

Kovács et al., "Visualizing queries in a distributed digital library system", Computer and Automation Research Institute of the Hungarian Academy of Sciences, Jan. 1, 2000, XP55046965, pp. 110-117.

\* cited by examiner

DYNAMIC SEARCH BOX FOR WEB BROWSER

RELATED APPLICATION

This application is a continuation of U.S. patent application Ser. No. 11/321,075, filed on Dec. 30, 2005, the disclosure of which is hereby incorporated by reference herein.

BACKGROUND

1. Field of the Invention

Implementations relate generally to information retrieval and, more particularly, to providing potential refinements and optimizations for query submissions.

2. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results (e.g., web pages) to the user based on the search query. Typically, the search engine accomplishes this by matching the terms in the search query to a corpus of pre-stored web pages. Web pages that contain the user's search terms are identified as search results and are returned to the user as links.

Many companies currently offer add-on toolbars to improve the users' search experience. Oftentimes, these add-on toolbars provide functionality that is not available in existing web browsers. For example, an add-on toolbar may permit a user to perform a search right from the toolbar, permit terms to be highlighted on a web page, provide pop-up protection, and do other things to assist the user in finding information of interest.

SUMMARY

According to one aspect, a method may include receiving one or more terms of a search query; automatically identifying prior search queries including the one or more terms of the search query from a history of prior search queries; and presenting query refinement options including the prior search queries as suggested queries for possible selection by a user.

According to another aspect, a system may include means for presenting a toolbar in a web browser, the toolbar may include a search box; means for receiving one or more terms of a search query into the search box; means for automatically identifying prior search queries that include the one or more terms of the search query from a history of prior search queries; means for spell-checking the one or more terms of the search query to identify potential corrections to the one or more terms of the search query; and means for presenting query refinement options associated with the search box, the query refinement box configured to include the previously received search queries and the identified potential corrections as suggested queries for possible selection by a user.

According to a further aspect, a method, performed by a device, may include providing a dynamic search box selectable object within a web browser application window; receiving a search query within the dynamic search box selectable object; identifying local historical search queries matching at least a portion of the received search query; identifying possible spelling corrections to the received search query; identifying server-based historical search queries beginning with the received search query; and populating a refinement box associated with the dynamic search box selectable object with the identified local historical search queries, the identified possible spelling corrections, and the identified server-based historical search queries.

According to still another aspect, a method may be provided. The method may include receiving a search query; identifying query tokens within the search query, wherein the query tokens relate to query operations and syntax; and graphically presenting the search query to represent differences in the identified query tokens.

According to yet another aspect a computer-readable medium that stores instructions executable by a client device is provided. The computer-readable medium may include instructions for causing the client device to receive one or more terms of a search query; instructions for causing the client device to automatically identify prior search queries including the one or more terms of the search query from a history of prior search queries; instructions for causing the client device to automatically identify possible spelling corrected queries based on the one or more terms of the search query; and instructions for causing the client device to present query refinement options to the user, the query refinement options including the previously received search queries as suggested queries and the possible spelling corrected queries for possible selection by a user.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

OVERVIEW

Implementations consistent with the principles of the invention may relate to a dynamic search box for providing query refinement assistance and/or suggestions for assisting users in more rapidly accessing desired information. For example, in one implementation, user entry of initial query characters may result in suggested completed queries being provided to the user for potential selection. In additional implementations, upon initial search character entry, users may be provided with additional refinement options, such as search context options, search term syntax descriptions, as well as additional query related actions.

The description to follow will describe the dynamic search box as included as part of an add-on toolbar. It should be understood that the description may equally apply to other implementations. For example, the dynamic search box may be implemented as a toolbar option in a web browser toolbar, a selectable object embedded within a document currently being displayed within a web browser window, or a function included within a frame within a web browser window. It should be appreciated to those skilled in the art that in yet other embodiments, other mechanisms—which may or may not be integrated within a browser—for providing the dynamic search box functionality described herein may be used without departing from the spirit of the present invention. The phrase "dynamic search box," as used herein, will be used to refer to any of these implementations of the dynamic search box functionality.

Figure 1:
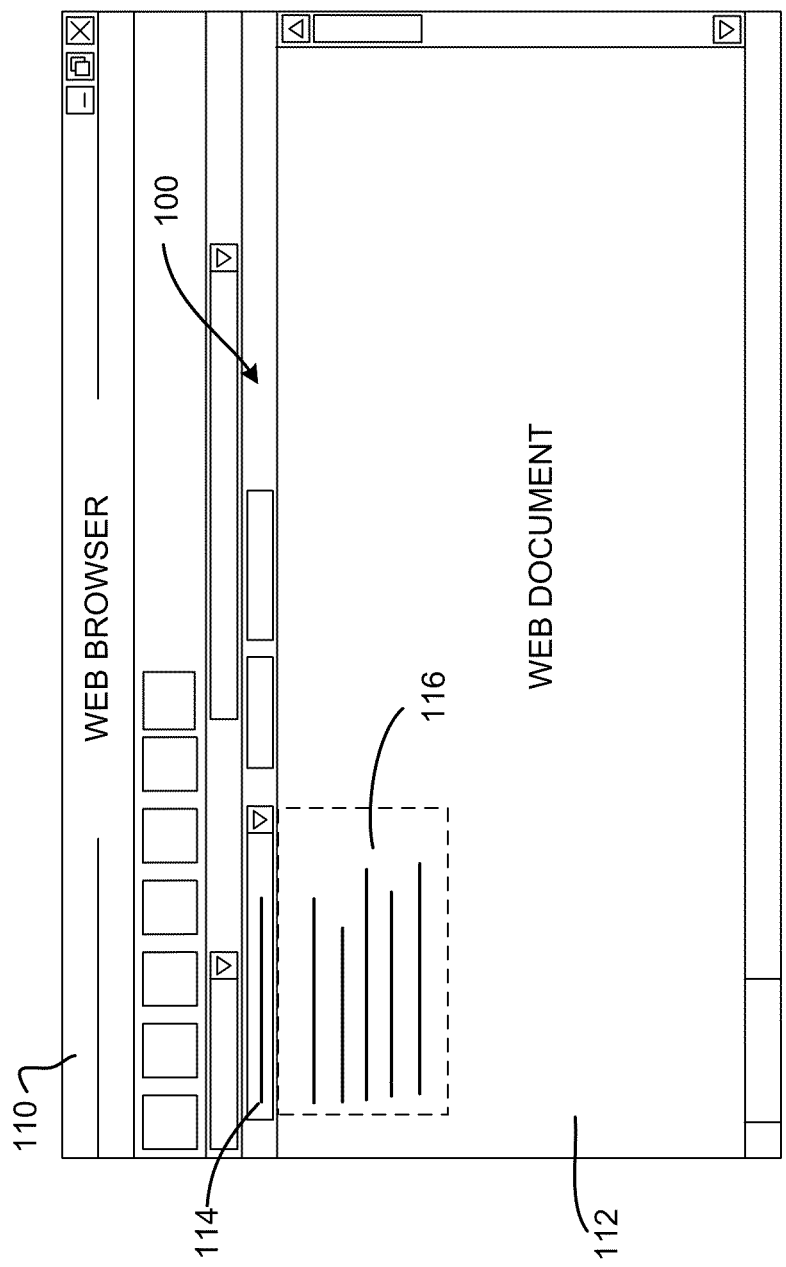
FIG. 1 is an exemplary diagram illustrating a concept consistent with the principles of the invention.

FIG. 1 is an exemplary diagram illustrating concepts consistent with the principles of the invention. As shown in FIG. 1, an add-on toolbar 100 may be associated with a web browser 110 displaying a web document 112. The add-on toolbar may include a dynamic search box 114 as well as one or more buttons. Dynamic search box 114 may permit the user to enter one or more characters and have a search performed based on the entered term(s). In accordance with principles of the invention, upon receipt of at least one character in dynamic search box 114, a refinement drop-down box 116 may be automatically provided within web browser 110. More specifically, refinement drop-down box 116 may include query refinements or suggestions based on the character(s) received in dynamic search box 114. Alternatively, refinement drop-down box 116 may also provide additional query refinement functionality.

For example, refinement drop-down box 116 may provide users with easily selectable options for modifying a search context for the present query or for performing additional search or query related functions. As used herein, the phrase "search context" refers to the corpus of documents searched in response to the received and/or refined terms. For example, users may perform a web search, a product search, an image search, etc. An additional implementation consistent with principles of the present invention may provide syntax highlighting for the received and/or refined query terms. In this manner, users may be more aware of the manner in which the requested search is performed.

A "document," as the term is used herein, is to be broadly interpreted to include any machine-readable and machine-storable work product. A document may include, for example, an e-mail, a web site, a file, a combination of files, one or more files with embedded links to other files, a news group posting, a blog, a business listing, an electronic version of printed text, a web advertisement, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Network Configuration

Figure 2:
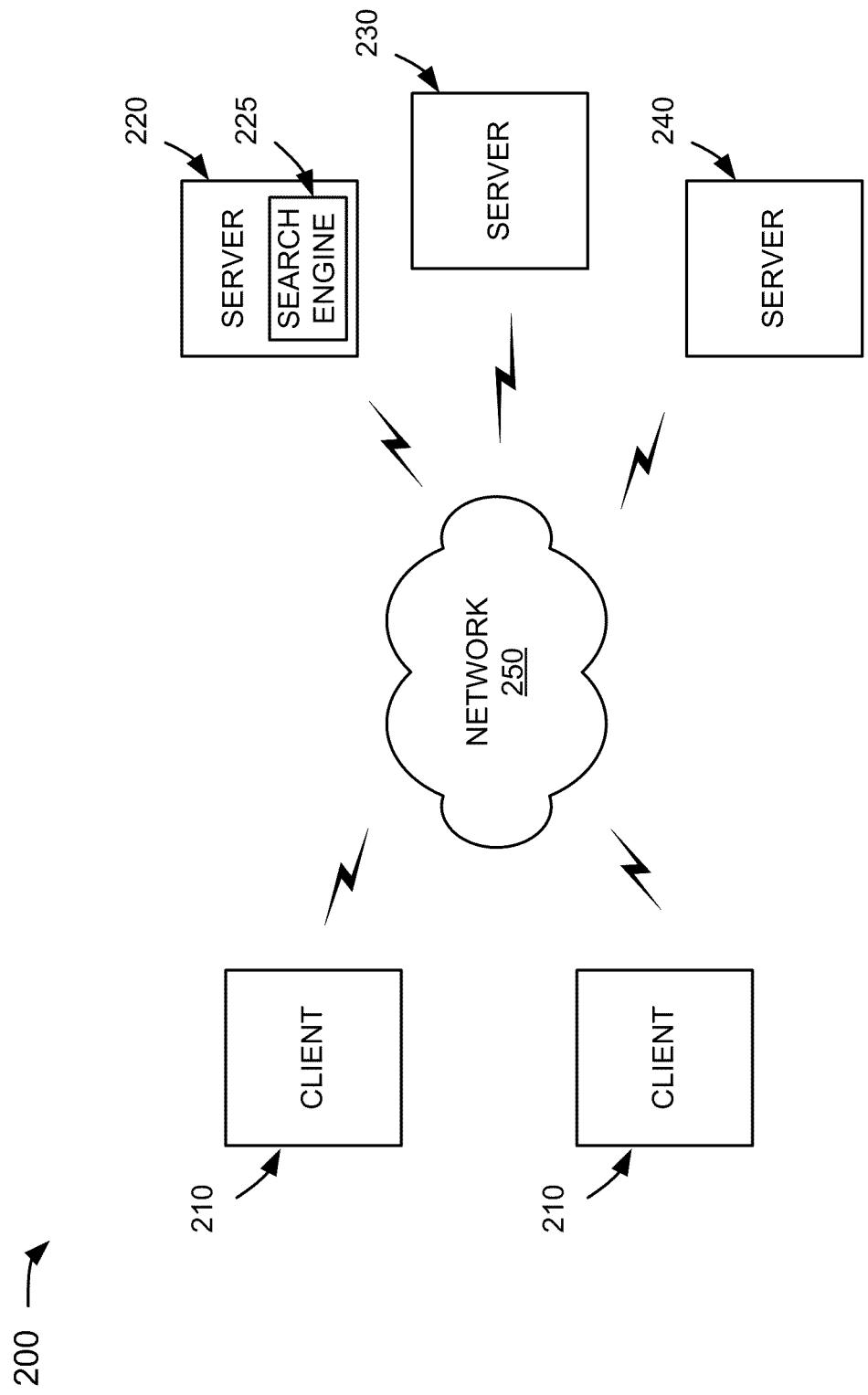
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executable by one of these devices.

Servers 220-240 may include server entities that gather, process, search, and/or maintain documents in a manner consistent with the principles of the invention. In an implementation consistent with the principles of the invention, server 220 may include a search engine 225 usable by clients 210. Server 220 may crawl a corpus of documents, index the documents, and store information associated with the documents in a repository of documents. Servers 230 and 240 may store or maintain documents that may be crawled or analyzed by server 220.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, or a combination of networks. Clients 210 and servers 220-240 may connect to network 250 via wired, wireless, and/or optical connections.

Exemplary Client/Server Architecture

Figure 3:
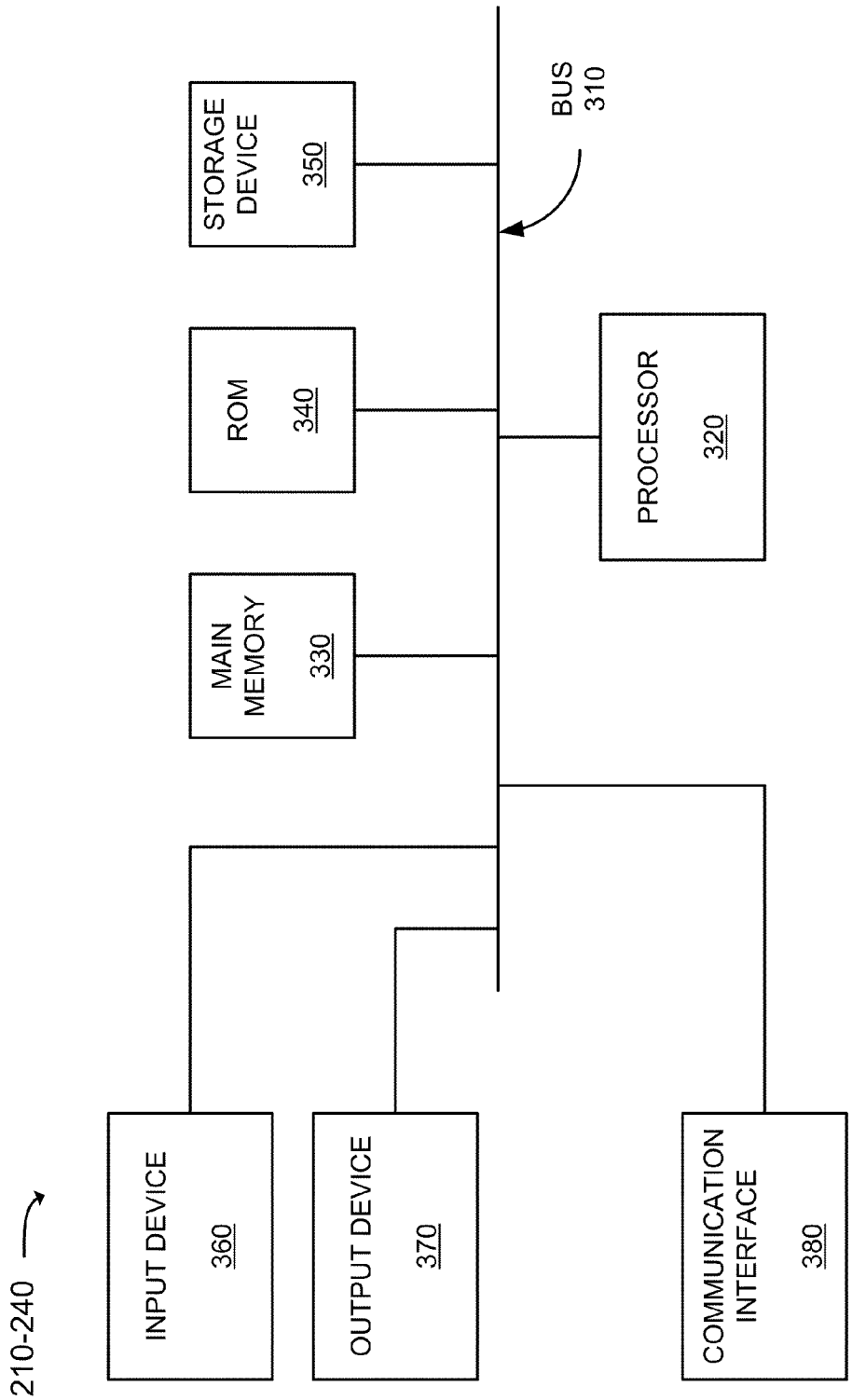
FIG. 3 is an exemplary diagram of a client or server of FIG. 2.

FIG. 3 is an exemplary diagram of a client or server entity (hereinafter called "client/server entity"), which may correspond to one or more of clients 210 and/or servers 220-240. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity, consistent with the principles of the invention, may perform certain search-related operations. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Computer-Readable Medium

Figure 4:
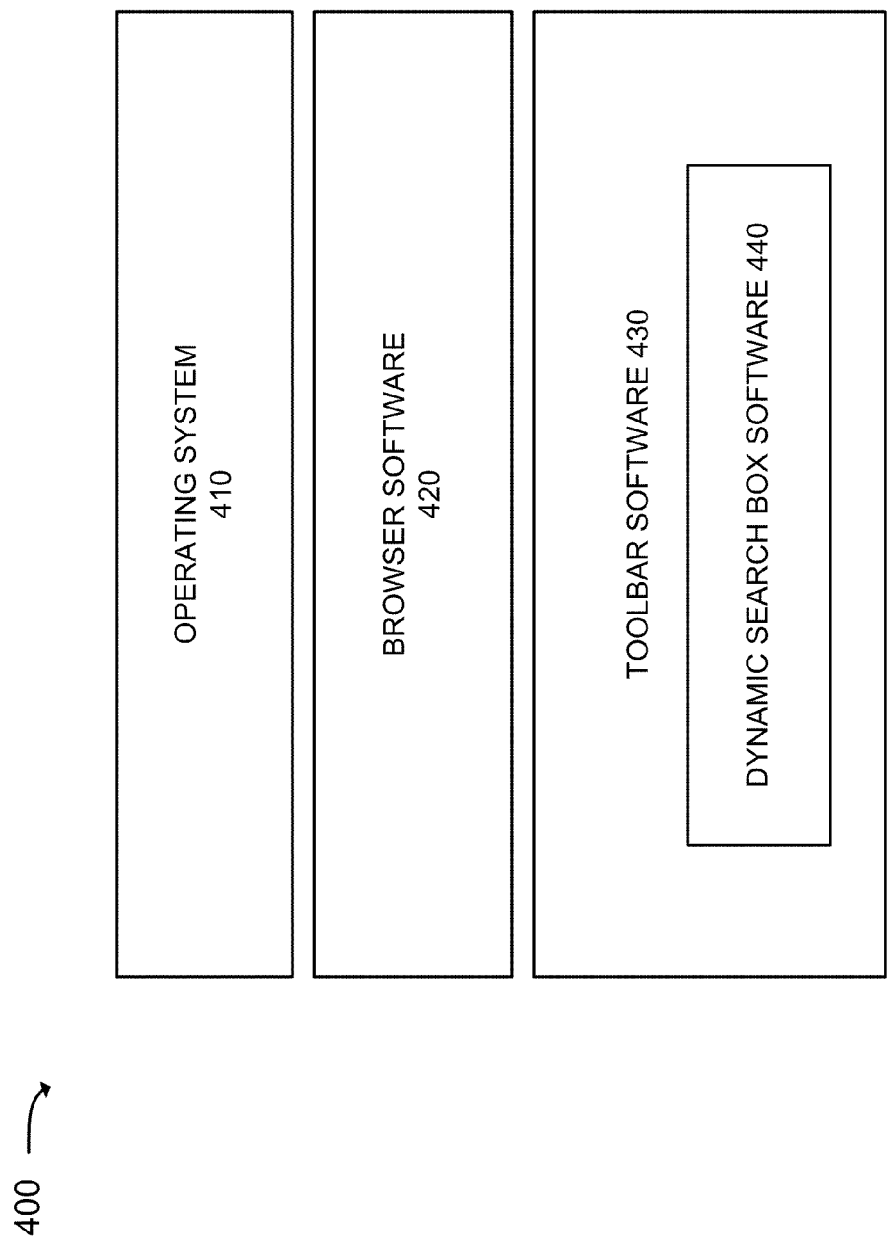
FIG. 4 is a diagram of a portion of an exemplary computer-readable medium that may be used by a client of FIG. 2.

FIG. 4 is a diagram of a portion of an exemplary computer-readable medium 400 that may be used by a client 210. In one implementation, computer-readable medium 400 may correspond to memory 330 of a client 210. The portion of computer-readable medium 400 illustrated in FIG. 4 may include an operating system 410, browser software 420, toolbar software 430, and dynamic search box software 440.

More specifically, operating system 410 may include operating system software, such as the Microsoft Windows®, Unix, or Linux operating systems. Browser software 420 may include software associated with a web browser, such as the Microsoft Internet Explorer, Netscape Navigator®, Mozilla Firefox®, or Apple Safari® browser.

Toolbar software 430 may cause a user interface object, such as an add-on toolbar, to be presented within a web browser window. The user interface object may operate in conjunction with the web browser. In another implementation, the user interface object may be part of the web browser. In this latter implementation, the web browser may perform the functions of the user interface object. In yet another implementation, the user interface object may be a process separate from the web browser. For example, the user interface object may interface between the web browser and network 250.

Toolbar software 430 may be automatically activated upon initiation of the web browser. Alternatively, toolbar software 430 may be activated when instructed by a user. In either case, toolbar software 430 may take the form of a user interface object, as described above. Toolbar software 430 may include dynamic search box software 440 for presenting and implementing the dynamic search box functionalities described herein.

Figure 5:
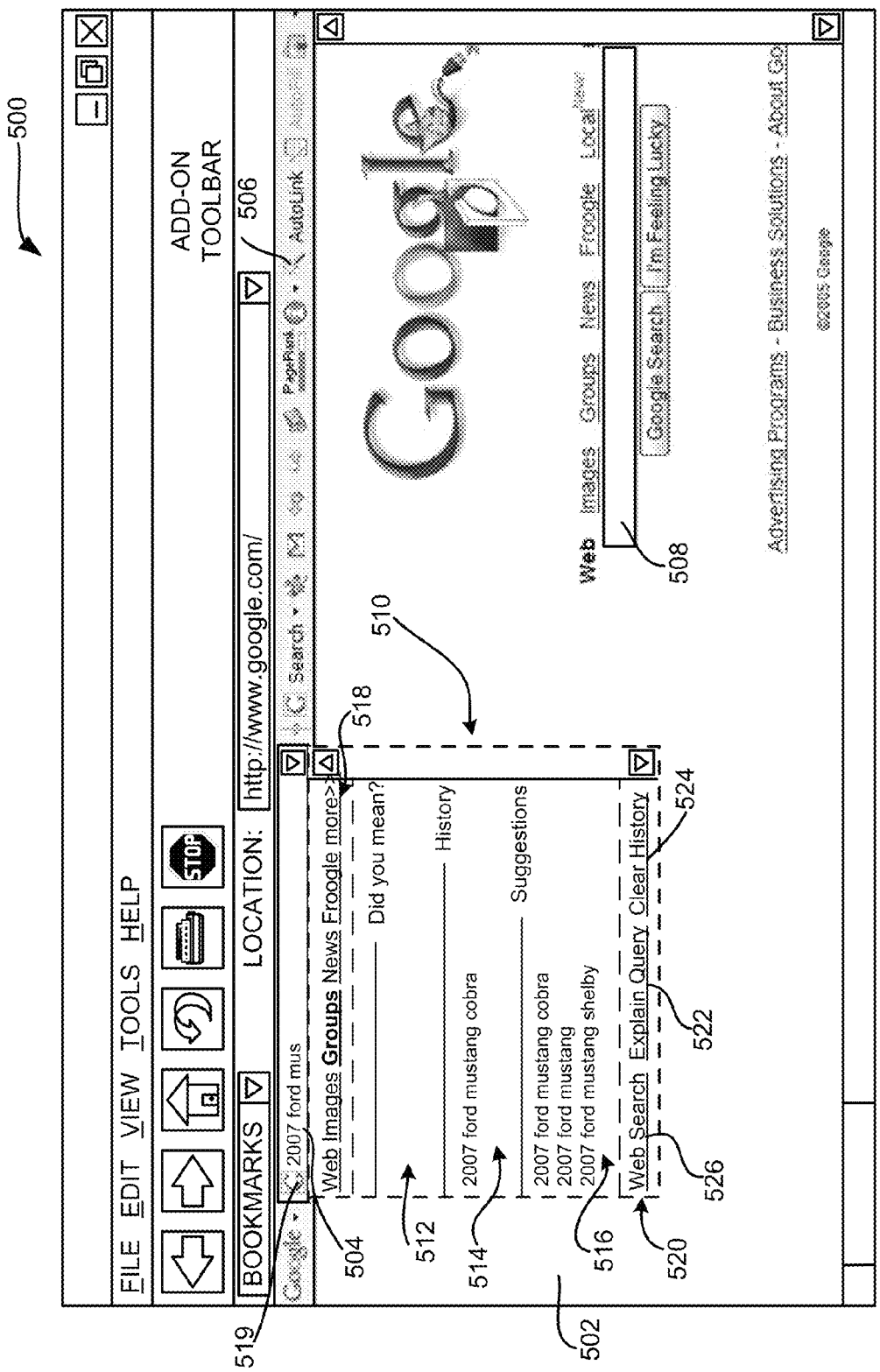
FIG. 5 is an exemplary diagram of a graphical user interface that illustrates various implementations of a dynamic search box.

FIG. 5 is an exemplary diagram of a graphical user interface 500 that illustrates various implementations of the search box feature. Graphical user interface 500 may, for example, correspond to a web browser window that currently displays a document 502.

According to one implementation, the dynamic search box may be implemented as a text entry box 504 within an add-on toolbar 506. In addition to text entry box 504, add-on toolbar 506 may include additional search boxes, software buttons, and/or menu elements selectable by a user to initiate different functions performed by add-on toolbar 506. In the present implementation, a user may initiate features of the dynamic search box by selecting (e.g., clicking on) text entry box 504 on the add-on toolbar 506. According to another implementation, the dynamic search box may be implemented as text entry box 508 embedded within the document currently being displayed within a web browser window. It should be appreciated to those skilled in the other art that in yet other implementations, other mechanisms—which may or may not be integrated within a web browser—for providing functionality of the dynamic search box feature described herein may be used without departing from the spirit of the present invention.

Text entry box 504 may be configured to receive one or more characters that the user wishes to include as a basis for a search query. As shown in FIG. 5, in the present example, the user has initially input "2007 ford mus" as a start for a potential search query. In accordance with principles of the invention, dynamic search box software 440 may identify the input terms and initiate a query refinement search based on the received terms even as the user continues to add to the search query. The results of the query refinement search may be automatically presented to the user in a refinement box 510. As the user continues to modify the contents of text entry box 504, the content of the refinement drop-down box 510 also dynamically adjusts accordingly. In one implementation consistent with principles of the invention, text entry box 504 and/or refinement drop-down box 510 may be dynamically resized based on the information included therein. For example, in situations where a user submits a search query longer than the text entry box may initially display, text entry box 504 may be resized to allow complete display of the received terms. Similarly, refinement drop-down box 510 may be dynamically resized in both width and length to allow for display of suggested queries or search results exceeding an initial box size.

In accordance with principles of the invention, refinement drop-down box 510 may be configured to display several types of query refinement information. More particularly, query refinements based upon potential misspellings or other typographical errors within the received terms may be presented to the user in a "did you mean" section 512. Query refinements relating to the received terms and identified within a prior history of client 210 may be presented to the user in a "history" section 514. Query refinements relating to the received terms and identified based on non-user-specific historical search information may be presented to the user in a "suggestions" section 516.

In addition to providing the query refinement options set forth above, refinement drop-down box 510 may also provide users with several additional search related functions. For example, a context section 518 may inform the user of the present search context and enable the user to select a different search context. As shown in FIG. 5, various search contexts may be displayed in context section 518 with an active context being highlighted. In one exemplary implementation, users may select an alternate search context in various ways. For example, a user may select an alternate search context by using a mouse to click on the desired context. Alternately, users may scroll through the various search contexts by using pre-defined keystrokes on a user input device. In one implementation, selection of the page up and page down keys enables users to progress forward and backward through the listing of available search contexts. In still another implementation, context section 518 is displayed upon selection of a context icon 519 included within text box 504.

An actions section 520 may present additional options relating to the operation of dynamic search box software 440. For example, actions section 520 may include an explain query option 522, a clear history option 524, and a return to a web search option 526. Additional details regarding options 522-526 will be set forth in additional detail below.

In some implementations consistent with principles of the invention, additional search—related information may be presented to the user in refinement drop-down box 510. For example, a complete or partial listing of search results may be presented in response to specific types of queries or queries received for selected search contexts. For example, where a user has selected local bookmarks as a search context, terms received into text entry box 504 may result in matching bookmarks being retrieved and displayed in refinement drop-down box 510. Selection of an identified bookmark may then result in the display of the web page associated with the selected bookmark. Similarly, search results may be provided in response to traditional web searches as well, with the result listing dynamically changing upon receipt of additional terms or selection of an available query refinement suggestion. In this manner, users may more quickly access search results associated with input or selected query terms.

Exemplary Processing

Figure 6:
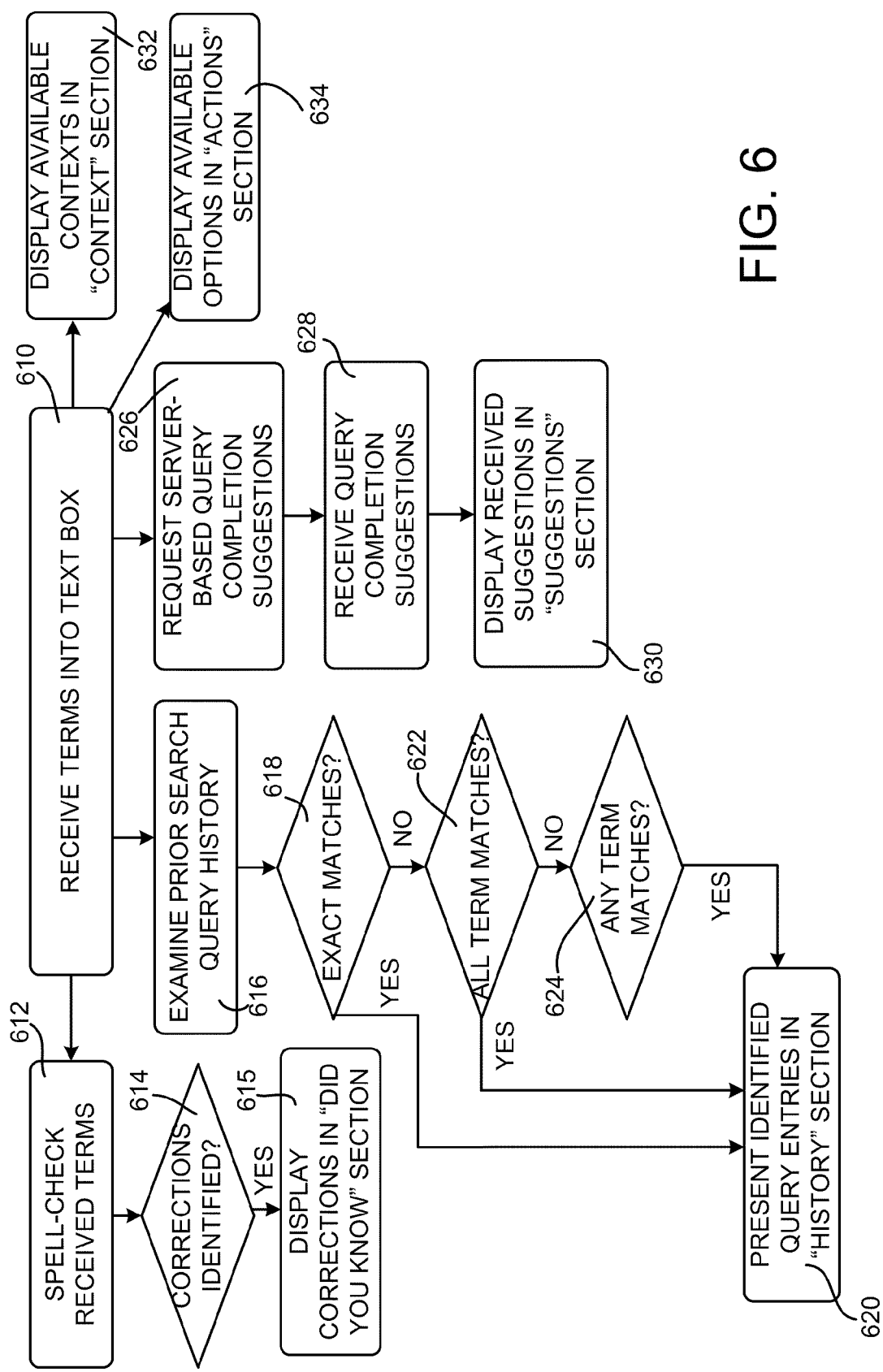
FIGS. 6 and 7 are flowcharts of exemplary processing for implementing a dynamic search box feature.
Figure 7:
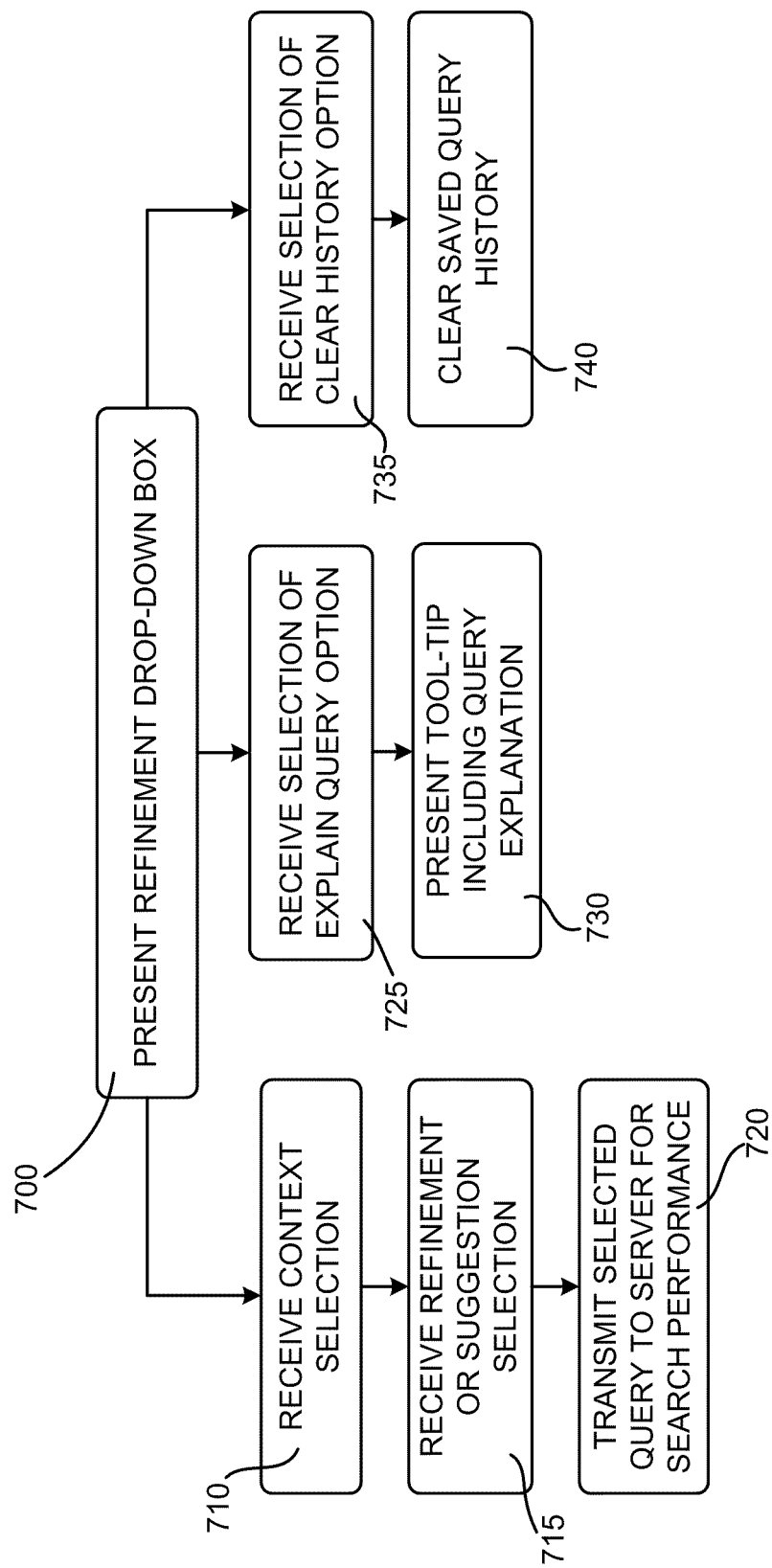

FIGS. 6 and 7 are flowcharts of an exemplary process for implementing a dynamic search box feature. In one embodiment, the processing of FIGS. 6 and 7 may be performed by one or more software and/or hardware components within client 210, server 220, or a combination of client 210 and server 220. In another implementation, the processing may be performed by one or more software and/or hardware components within another device or a group of devices separate from or including client 210 and/or server 220.

Turning specifically to FIG. 6, processing may begin with text entry box 504 receiving one or more terms from a user to form the basis for a search query (act 610). As used herein, "term" may include one or more characters of a search query or possibly less than the entire search query. In response to the received terms, dynamic search box software 440 may perform spell-checking on the received terms (act 612). In accordance with implementations consistent with principles of the invention, the spell-checking may be performed either locally at client 210 or remotely using resources, such as server 220. In a remote server implementation, spell-check processing may be performed asynchronously to other query processing, thereby providing enhanced performance. Additionally, in order to provide enhanced responsiveness and decrease the load on the remote server, spell-check processing may be requested following expiration of a predetermined time period after a last query term is input. This prevents continuous server requests when the user has not yet completed their initial character submission.

Next, it is then determined whether any corrections were identified during spell-checking (act 614). If so, the identified corrected search queries are presented to the user in "did you mean" section 512 of refinement drop-down box 510 (act 615). In one implementation consistent with principles of the invention, the corrected portions of the identified corrected search queries may be highlighted using, for example, bolded, italicized or other suitable highlighting. If no corrected search queries are identified, "did you mean" section 512 may be removed from refinement drop down box 510.

Substantially simultaneously to the spell-checking of acts 612-614, dynamic search box software 440 may examine a history of prior search queries associated with the selected search context (act 616) and determine whether any history entries beginning with the same sequence of received terms exist (act 618). In one implementation consistent with principles of the invention, the history may be a local history of user search queries maintained at client device 210. Alternatively, the history may be a shared history including prior search queries for a number of different users. In one implementation, the shared history may include prior search queries for a number of friends or related individuals.

If it is determined that one or more history entries beginning with the received sequence of terms exist within the prior search history, the identified history entries are presented to the user in "history" section 514 of refinement drop-down box 510 (act 620).

If it is determined that no history entries beginning with the received sequence of characters exist within the prior search history, it is then determined whether any history entries including all of the received terms exists within the history of prior search queries (act 622). If so, the identified history entries are presented to the user in "history" section 514 of refinement drop-down box 510 (act 620).

If it is determined that no history entries are identified as including all of the received terms, it is then determined whether any history entries including any of the received terms exist within the history of prior search queries (act 624). If so, the identified history entries are presented to the user in "history" section 514 of refinement drop-down box 510 (act 620). If no history entries including any of the received terms are identified within the prior search history, "history" section 514 may be removed from the refinement drop-down box 510.

Dynamic search box software 440 may also request query completion suggestions from server 220 based on the received terms (act 626). In one implementation consistent with principles of the invention, the server-based query completion request may identify popular search queries beginning with the received terms. In one embodiment, as many as 10 query suggestions may be requested from server 220. In response to the request, dynamic search box software 440 may receive query completion suggestions from server 220 (act 628). The received query completion suggestions may be ranked and/or sorted based on popularity of the suggestion or respective number of search results. The suggestions may then be presented to the user in "suggestions" section 516 of refinement drop-down box 510 (act 630).

In response to the receipt of terms within text entry box 504, dynamic search box software 440 may also present a listing of available search contexts to the user in a context section 518 of refinement drop-down box 510 (act 632). As described above, a currently applied context may be highlighted within the listing of available search contexts. Additionally, a listing of available query options may be presented to the user in an actions section 520 of refinement-drop down box 510 (act 634).

Referring now to FIG. 7, processing is described relating to user selection of various elements within refinement drop-down box 510. Initially, refinement drop-down box 510 is presented to the user (act 700). Dynamic search box software 440 may then receive a user selection of a search context from within the available search contexts included within context section 518 of refinement drop-down box 510 (act 710). As described above, user selection of search context may be received in multiple ways, including, mouse or suitable pointing device selection of a link associated with a selected context and keyboard based selection of an available context. In one implementation consistent with principles of the invention, a web search is the default search context. Moreover, modifications to the default search context may be temporarily maintained for the current query, a predetermined time period, or made persistent for all future queries, until a subsequent change is made.

Dynamic search box software 440 may then receive a user selection of a query refinement or suggestion provided within refinement drop-down box 510 (act 715). In one implementation consistent with principles of the invention, the user selection may be performed by using a mouse or suitable pointing device to click or otherwise select an available query refinement. Alternatively, the user selection may be performed by using a keyboard or other input device to scroll through the listing of available refinements. Specifically in the keyboard embodiment, users may easily return to an unmodified query by reversing the keyboard commands previously used to select an available query refinement. Upon receipt of the selection of an available query refinement, dynamic search box software 440 transmits the selected query and selected search context to server 220 for search performance (act 720).

Dynamic search box software 440 may also receive a user selection of explain query option 522 provided in action section 520 of refinement drop-down section 510 (act 725). In response, dynamic search box software 440 may present a tool-tip or other notification window providing an explanation of the syntax of the current query (act 730). For example, a web search query for "apple-computer" may result in an explain query notification window content of search the web for "apple" but not "computer".

Dynamic search box software 440 may receive a user selection of clear history option 524 provided in action section 520 of refinement drop-down section 510 (act 735). In response, dynamic search box software may clear or otherwise delete the user's query history (act 740).

Context Highlighting

Figure 8:
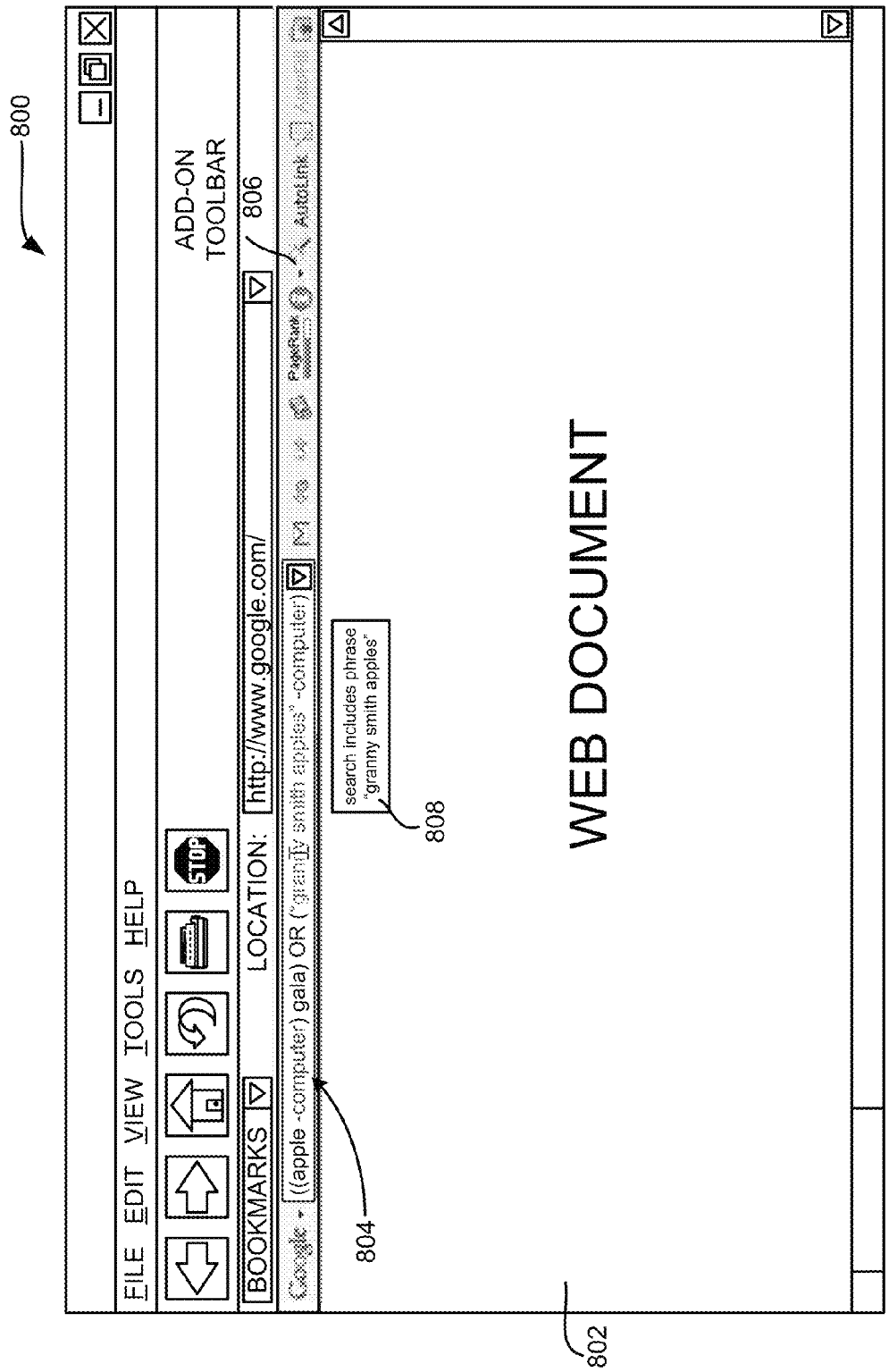
FIG. 8 is an exemplary diagram of a graphical user interface that illustrates a context highlighting feature provided by the dynamic search box feature.

FIG. 8 is an exemplary diagram of a graphical user interface 800 that illustrates a context highlighting feature provided by dynamic search box software 440. Graphical user interface 800 may, for example, correspond to a web browser window that currently displays a web document 802.

According to one implementation consistent with principles of the invention, the dynamic search box may be implemented as a text entry box 804 within an add-on toolbar 806. In addition to text entry box 804, add-on toolbar 806 may include additional search boxes, software buttons, and/or menu elements selectable by a user to initiate different functions performed by add-on toolbar 806. In the present implementation, a user may initiate features of the dynamic search box software 440 by inputting one or more search terms into text entry box 804 on add-on toolbar 806. According to another implementation, the dynamic search box may be implemented as text entry box (not shown) embedded within the document currently being displayed within a web browser window. It should be appreciated to those skilled in the other art that in yet other implementations, other mechanisms— which may or may not be integrated within a web browser— for providing functionality of the dynamic search box feature described herein may be used without departing from the spirit of the present invention.

In accordance with principles of the invention, searches performed in response to terms received into text entry box may be complex searches. As described herein, complex searches may include various keyword modifiers or tokens operable to modify the manner in which searches including the tokens are performed. In this manner, complex Boolean operations, grouping structures, or other query operations may be incorporated into a search query.

Examples of suitable query tokens may include a minus sign to designate a keyword to be excluded; quotation marks to designate an exact phrase; a tilde sign to designate to include synonyms for the following keyword; a "site:" prefix to designate a domain specific search; an OR or * to designate a logical or'ing for adjacent keywords or groups; various mathematical operators; ellipses between numbers to designate the range of all numbers; and parentheses to designate keyword groupings.

In one embodiment consistent with principles of the invention, different types of highlighting may be used on different query tokens and their associated keywords to enable rapid identification of each tokens affect on the complete query. As shown in FIG. 8, upon receipt of one or more search terms within text entry box 804, the syntax for the search terms may be automatically highlighted to provide easy recognition of the associated syntax functions. For example, by using different colors, highlighting, bolding, etc., various functions may be identified. As shown in FIG. 8, the query ((apple-computer) gala) OR ("granny smith apples"-computer) may represent a search for documents containing "apple" but not "computer" AND gala, OR the exact phrase "granny smith apples" but not "computer". By modifying the highlighting and text colors for the various tokens contained within the query, users can more readily ascertain the effect a query token may have on the resulting query.

In addition to syntax highlighting, tool-tips (e.g., tool-tip 808) may be used to provide explanations to the various tokens included with a query. By mousing over or hovering over a token in a query, an explanation of the effect of the token may be provided. For example, as shown in FIG. 8, in response to a user hovering over "granny smith apples" in the query, dynamic search software 430 generates tool-tip 808 indicating that the query tokens " " require that search results include the exact phrase "granny smith apples". Alternately, by mousing over a blank portion of the text box 804, or a non-highlighted keyword, an explanation of the entire query may be provided.

Conclusion

Systems and methods consistent with the principles of the invention may provide a dynamic search box for quickly and unobtrusively providing search refinements based on received search terms. Alternative, the dynamic search box may provide query syntax highlighting for assisting users in readily identifying query components.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 6 and 7, the order of the acts may be modified in other implementations consistent with the principles of the invention. Further, non-dependent acts may be performed in parallel.

Also, exemplary user interfaces have been described with respect to FIGS. 5 and 8. In other implementations consistent with the principles of the invention, the user interfaces may include more, fewer, or different pieces of information.

The preceding description refers to a user. A "user" is intended to refer to a client, such as a client 210 (FIG. 2), or an operator of a client 210.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    storing, by a processor of a client device, previously received search queries associated with a user of the client device;
    receiving, by a processor of the client device and from the user, one or more characters of a search query;
    presenting, by a processor of the client device and based on receiving the one or more characters of the search query, a listing of available search contexts to the user;
    receiving, by a processor of the client device, a selection of a search context included in the listing of available search contexts;
    identifying, by a processor of the client device and based on the search context, a plurality of the previously received search queries that include the one or more characters of the search query;
    spell-checking, by a processor of the client device, the one or more characters of the search query;
    determining, by a processor of the client device, one or more modifications to the one or more characters of the search query based on spell-checking the one or more characters of the search query;
    before search results for the search query are presented for display, presenting, by a processor of the client device and to the user, query refinement options that include the plurality of the previously received search queries and the one or more modifications to the one or more characters of the search query,
    the one or more modifications to the one or more characters being presented in a section separately from the plurality of the previously received search queries, and
    the plurality of the previously received search queries being different from the one or more characters of the search query;
    receiving, by a processor of the client device, at least one additional character of the search query;
    identifying, by a processor of the client device, a particular query, of the plurality of the previously received search queries, that does not include the at least one additional character of the search query;
    removing, by a processor of the client device, the particular query from the presented query refinement options, the particular query being removed prior to the search results for the search query being presented for display.

2. The method of claim 1, where the previously received search queries are received from a group of users that includes the user of the client device, the group of users being associated with the client device.

3. The method of claim 1, where each of the plurality previously received search queries, included in the query refinement options, begins with the one or more characters of the search query.

4. The method of claim 1, where spell-checking the one or more characters of the search query includes:
    determining an amount of time that has passed since a last character, of the one or more characters of the search query, was received; and
    spell-checking the one or more characters of the search query when the amount of time satisfies a time threshold.

5. The method of claim 1, further comprising:
    identifying query tokens associated with the one or more characters of the search query; and
    presenting the identified query tokens, where the identified query tokens are visually distinguished based on respective different syntax rules associated with the identified query tokens.

6. The method of claim 1, further comprising:
    identifying other previously received search queries that include the one or more characters of the search query, where the other previously received search queries are associated with another client device; and
    presenting, separately from the plurality of the previously received search queries and the one or more modifications to the one or more characters of the search query, additional query refinement options that include the other previously received search queries.

7. The method of claim 1, where presenting the query refinement options includes:
    presenting the query refinement options within a graphical box, at least one dimension of the graphical box being based on the plurality of the previously received search queries, and where removing the particular query from the presented query refinement options further includes:
    resizing the graphical box based on removing the particular query from the presented query refinement options.

8. A device comprising:
    a memory to store previously received search queries associated with a user of the device; and
    a processor to:
    receive one or more characters of a search query associated with the user,
    present, based on receiving the one or more characters of the search query, a listing of available search contexts to the user,
    receive a selection of a search context included in the listing of available search contexts,
    identify, based on the search context, a plurality of the previously received search queries that include the one or more characters of the search query,
    spell-check the one or more characters of the search query,
    determine, based on spell-checking the one or more characters of the search query, one or more modifications to the one or more characters of the search query,
    present, before search results for the search query are presented for display, query refinement options that include the plurality of the previously received search queries and the one or more modifications to the one or more characters of the search query,
the one or more modifications to the one or more characters being presented in a section separately from the plurality of the previously received search queries, and
the plurality of the previously received search queries being different from the one or more characters of the search query,
receive at least one additional character of the search query,
update, before the search results for the search query are presented for display, the presented query refinement options based on the received at least one additional character of the search query,
the processor, when updating the presented query refinement options, being further to:
identify a particular query, of the plurality of the previously received search queries, that does not include the at least one additional character of the search query, and
remove the particular query from the presented query refinement options.

9. The device of claim 8, where each of the plurality previously received search queries begins with the one or more characters of the search query.

10. The device of claim 8, where the processor, when spell-checking the one or more characters of the search query, is further to:
determine that an amount of time that has passed since a last character, of the one or more characters of the search query, was received, and
spell-check the one or more characters of the search query after the amount of time satisfies a time threshold.

11. The device of claim 8, where the processor is further to:
identify query tokens associated with the one or more characters of the search query, and
present the identified query tokens, where the identified query tokens are visually distinguished based on respective different syntax rules associated with the identified query tokens.

12. The device of claim 8, where the processor is further to:
identify other previously received search queries that include the one or more characters of the search query, where the other previously received search queries are associated with another device that differs from the device, and
present, separately the plurality of the previously received search queries and the one or more modifications to the one or more characters of the search query, additional query refinement options that include the other previously received search queries.

13. The device of claim 8, where the processor, when presenting the query refinement options, is further to:
present a graphical box, at least one dimension of the graphical box being based on the plurality of the previously received search queries, and
present the query refinement options within the graphical box, and where the processor, when updating the query refinement options, is further to:
resize the graphical box based on removing the particular query from the presented query refinement options.

14. A non-transitory memory storage device storing instructions executed by a computer, the instructions comprising:
one or more instructions that, when executed by a processor, cause the processor to receive one or more characters of a search query associated with a user;
one or more instructions to present, based on receiving the one or more characters of the search query, a listing of available search contexts to the user;
one or more instructions to receive a selection of a search context included in the listing of available search contexts;
one or more instructions that, when executed by the processor, cause the processor to identify, based on the search context, a plurality of previously received search queries associated with the user, that include the one or more characters of the search query;
one or more instructions that, when executed by the processor, cause the processor to spell-check the one or more characters of the search query;
one or more instructions that, when executed by the processor, cause the processor to determine, based on spell-checking the one or more characters of the search query, one or more modifications to the one or more characters of the search query;
one or more instructions that, when executed by the processor, cause the processor to present, to the user and before search results for the search query are presented for display, query refinement options that include the plurality of previously received search queries and the one or more modifications to the one or more characters of the search query,
the one or more modifications to the one or more characters being presented in a section separately from the plurality of the previously received search queries, and
the plurality of the previously received search queries being different from the one or more characters of the search query;
one or more instructions that, when executed by the processor, cause the processor to receive at least one additional character of the search query;
one or more instructions that, when executed by the processor, cause the processor to identify a particular query, of the plurality of previously received search queries, that does not include the at least one additional character of the search query; and
one or more instructions that, when executed by the processor, cause the processor to remove, prior to the search results for the search result being presented for display, the particular query from the presented query refinement options.

15. The non-transitory memory storage device of claim 14, where each of the plurality of previously received search queries begins with the one or more characters of the search query.

16. The non-transitory memory storage device of claim 14, where the one or more instructions to spell-check the one or more characters of the search query further include:
one or more instructions to determine an amount of time that has passed since a last character, of the one or more characters of the search query, was received; and
one or more instructions to spell-check the one or more characters of the search query when the amount of time satisfies a time threshold.

17. The non-transitory memory storage device of claim 14, where the instructions further include:
one or more instructions to identify query tokens associated with the one or more characters of the search query; and
one or more instructions to present the identified query tokens, where the identified query tokens are visually distinguished based on respective different syntax rules associated with the identified query tokens.

18. The non-transitory memory storage device of claim 14, where the instructions further include:
  one or more instructions to identify other previously received search queries that include each of the one or more characters of the search query, where the other previously received search queries are associated with one or more users that differ from the user associated with the search query; and
  one or more instructions to present, to the user and separately from the plurality of previously received search queries and the one or more modifications to the one or more characters of the search query, additional query refinement options that include the other previously received search queries.

19. The non-transitory memory storage memory device of claim 14, where the one or more instructions to present the query refinement options further include:
  one or more instructions to present the query refinement options within a graphical box, at least one dimension of the graphical box being based on the plurality of previously received search queries, and
  where the one or more instructions to remove the particular query further include:
  one or more instructions to resize the graphical box based on removing the particular query from the presented query refinement options.

\* \* \* \* \*